US011377185B2

(12) United States Patent
Pennestri

(10) Patent No.: US 11,377,185 B2
(45) Date of Patent: *Jul. 5, 2022

(54) JET PUMP SYSTEMS

(71) Applicant: Pennestri Products, LLC, Liberty Lake, WA (US)

(72) Inventor: Scott Anthony Pennestri, Liberty Lake, WA (US)

(73) Assignee: Pennestri Products, LLC, Liberty Lake, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/035,112

(22) Filed: Sep. 28, 2020

(65) Prior Publication Data

US 2021/0024190 A1 Jan. 28, 2021

Related U.S. Application Data

(63) Continuation-in-part of application No. 16/908,123, filed on Jun. 22, 2020, now abandoned, which is a
(Continued)

(51) Int. Cl.
*B63H 11/08* (2006.01)
*H02K 5/132* (2006.01)
(Continued)

(52) U.S. Cl.
CPC ............ *B63H 11/08* (2013.01); *H02K 5/132* (2013.01); *H02K 7/003* (2013.01); *H02K 7/04* (2013.01); *H02K 7/14* (2013.01); *H02K 9/22* (2013.01); *A63H 23/06* (2013.01); *B63H 2011/081* (2013.01)

(58) Field of Classification Search
CPC .. B63H 11/08; B63H 2011/081; H02K 5/132; H02K 7/003; H02K 7/04; H02K 7/14; H02K 9/22; A63H 23/06
See application file for complete search history.

(56) References Cited

U.S. PATENT DOCUMENTS 5,292,270 A    3/1994   Tucker et al.
6,022,250 A    2/2000   Futaki et al.
(Continued)

OTHER PUBLICATIONS

Office Action for U.S. Appl. No. 16/304,907, dated Nov. 22, 2019, Pennestri, "Jet Pump Systems", 6 Pages.
(Continued)

*Primary Examiner* — Stephen P Avila
(74) *Attorney, Agent, or Firm* — Lee & Hayes, P.C.

(57) ABSTRACT

A pump assembly includes an electric motor including a rotor having a shaft extending from the electric motor, the shaft including a substantially single unit of material and having an end rotationally couplable to an impeller that when the shaft is rotatably displaced by the electric motor, the impeller displaces a fluid to create a jet of fluid. An enclosure having a cavity arranged between a front surface and a back surface of the enclosure, and the electric motor being arrangeable in the cavity of the enclosure. The enclosure protecting the electric motor arranged in the enclosure from a fluid, and a dielectric fluid is containable in the cavity of the enclosure to immerse the electric motor in the dielectric fluid for preventing corrosion of the electric motor from the fluid.

14 Claims, 13 Drawing Sheets

Related U.S. Application Data continuation of application No. 16/304,907, filed as application No. PCT/US2016/034643 on May 27, 2016, now Pat. No. 10,689,079.

(51) Int. Cl.
*H02K 7/00* (2006.01)
*H02K 7/14* (2006.01)
*H02K 9/22* (2006.01)
*H02K 7/04* (2006.01)
*A63H 23/06* (2006.01)

(56) References Cited

U.S. PATENT DOCUMENTS

| | | |
|---|---|---|
| 10,689,079 B2 * | 6/2020 | Pennestri ............... B63H 11/08 |
| 2003/0148679 A1 | 8/2003 | Matsuda |
| 2004/0097147 A1 * | 5/2004 | Fuse ...................... B63H 11/08 |
| | | 440/38 |
| 2005/0206258 A1 * | 9/2005 | Gustafson ................ H02K 7/14 |
| | | 310/87 |
| 2008/0226440 A1 | 9/2008 | Therrien et al. |
| 2011/0201238 A1 * | 8/2011 | Rott ........................ B63B 32/10 |
| | | 440/6 |
| 2019/0276125 A1 | 9/2019 | Pennestri et al. |

OTHER PUBLICATIONS

PCT Search Report and Written Opinion dated Sep. 7, 2016 for PCT Application No. PCT/US16/34643, 13 pages.
PCT Written Opinion & Internatioanl Search Report, from corresponding PCT Application No. PCT/US16/34643, dated Nov. 30, 2017, 27 pages.

* cited by examiner

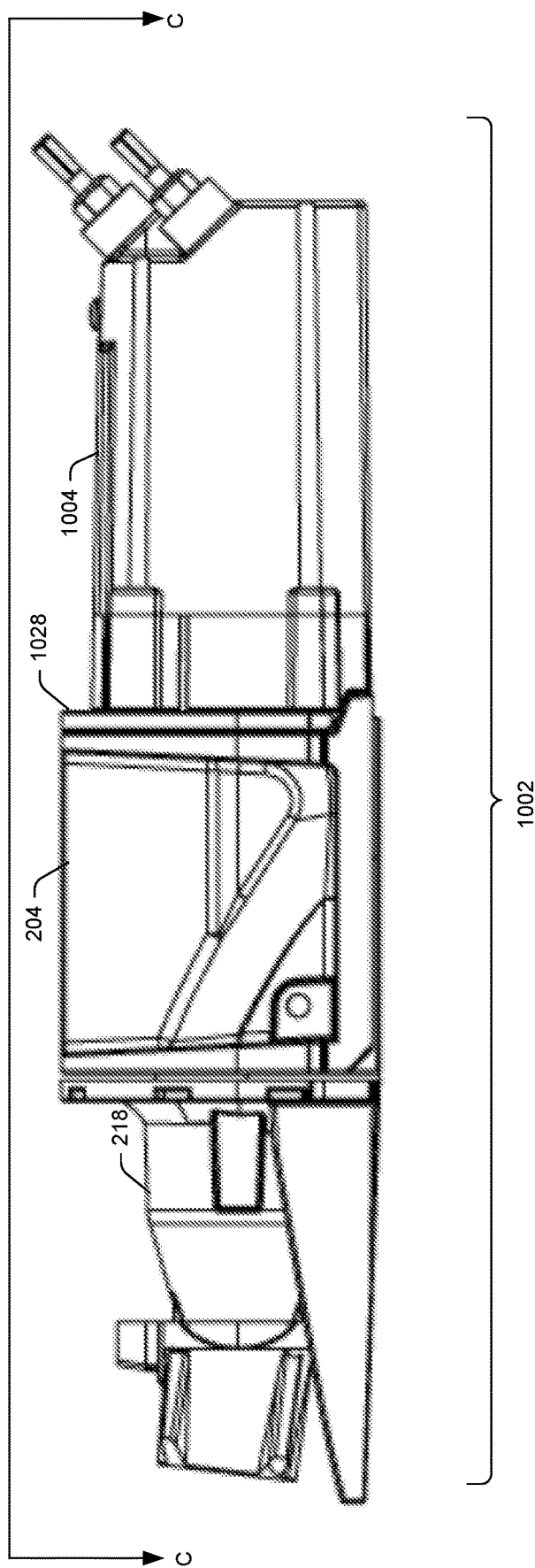

JET PUMP SYSTEMS

RELATED APPLICATIONS

This application claims priority as a continuation-in-part under 37 C.F.R. 1.78 to U.S. patent application Ser. No. 16/908,123, filed Jun. 22, 2020, which claims the benefit of U.S. Continuation patent application Ser. No. 16/304,907, filed on Nov. 27, 2018, which claims the benefit under 35 U.S.C. § 371 of International Application No. PCT/US16/34643, filed on May 27, 2016, the entire contents of each of which are incorporated herein by reference.

BACKGROUND

Jet pumps exist for remote control (RC) jet boats. Some existing jet pumps include an electric motor having a rotor coupled to a shaft, and the shaft can be coupled to an impeller. However, these existing jet pump assemblies cannot reach high rotation rates (e.g., above about 25,000 revolutions per minute (rpm)). For example, because the rotor of the electric motor is coupled to the shaft, the coupled shaft introduces inefficiencies at least at the coupling (e.g., a universal coupling, a joint, a universal joint, etc.) that prevents the electric motor from rotating the coupled shaft above about 25,000 rpm. Further, because the coupled shaft may be cantilevered (e.g., supported at one end and not supported at the other end), the cantilever introduces inefficiencies at least at the end of the coupled shaft coupled to the impeller that prevents the electric motor from rotating the coupled shaft above about 25,000 rpm.

Accordingly, there remains a need in the art for improved jet pumps that don't introduce inefficiencies, and are capable of reaching high rotation rates above about 25,000 rpm.

SUMMARY

Pump assemblies are configured to create a jet of water. Generally, the pump assemblies may include a motor including a rotor having a shaft formed substantially of a single unit of material that is coupled directly (i.e., void of a coupling, void of a universal coupling, void of a joint, void of a universal joint, etc.) to an impeller including a bearing surface received by a cooperating bearing surface arranged in a nozzle. Because the shaft of the rotor is coupled directly to the impeller, and the impeller has a bearing surface received by the nozzle, the pump assemblies are capable of reaching high rotation rates above about 25,000 revolutions per minute (rpm) for sustained periods of time. This summary is provided to introduce simplified concepts of pump assembly systems, which are further described below in the Detailed Description. This summary is not intended to identify essential features of the claimed subject matter, nor is it intended for use in determining the scope of the claimed subject matter.

In one example, a pump assembly for creating a jet of water includes a motor arrangeable adjacent to a front surface of a first body, the first body having a back surface opposite the front surface and at least a portion of a cavity arranged between the front surface and the back surface. The motor may include a rotor having a shaft extending from the motor and having an end arrangeable adjacent to the back surface of the first body, and the shaft including a substantially single unit of material. An impeller may be coupled to the end of the shaft. The impeller may include a bearing surface receivable by a cooperating bearing surface arranged in a second body (e.g., a nozzle), the second body arrangeable adjacent to the back surface of the first body. The bearing surface of the impeller, and the cooperating bearing surface of the second body, support the impeller rotationally on the shaft such that when the shaft is rotatably displaced by the motor, the impeller displaces the water into the cavity arranged between the front surface of the first body and the back surface of the first body and into the second body to create the jet of water.

In another example, a pump assembly for creating a jet of water includes a nozzle having an outlet opposite an inlet, and a receptacle arranged in the inlet of the nozzle. An impeller having a rear surface opposite a front surface may include a bearing surface that extends from the rear surface of the impeller opposite the front surface of the impeller, and at least a portion of the bearing surface may be received by the receptacle arranged in the inlet of the nozzle. The bearing surface of the impeller, and the receptacle arranged in the inlet of the nozzle, supporting the impeller rotationally.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 11A illustrates a perspective view of another example pump assembly for creating a jet of water.

DETAILED DESCRIPTION

Overview

Figure 1:
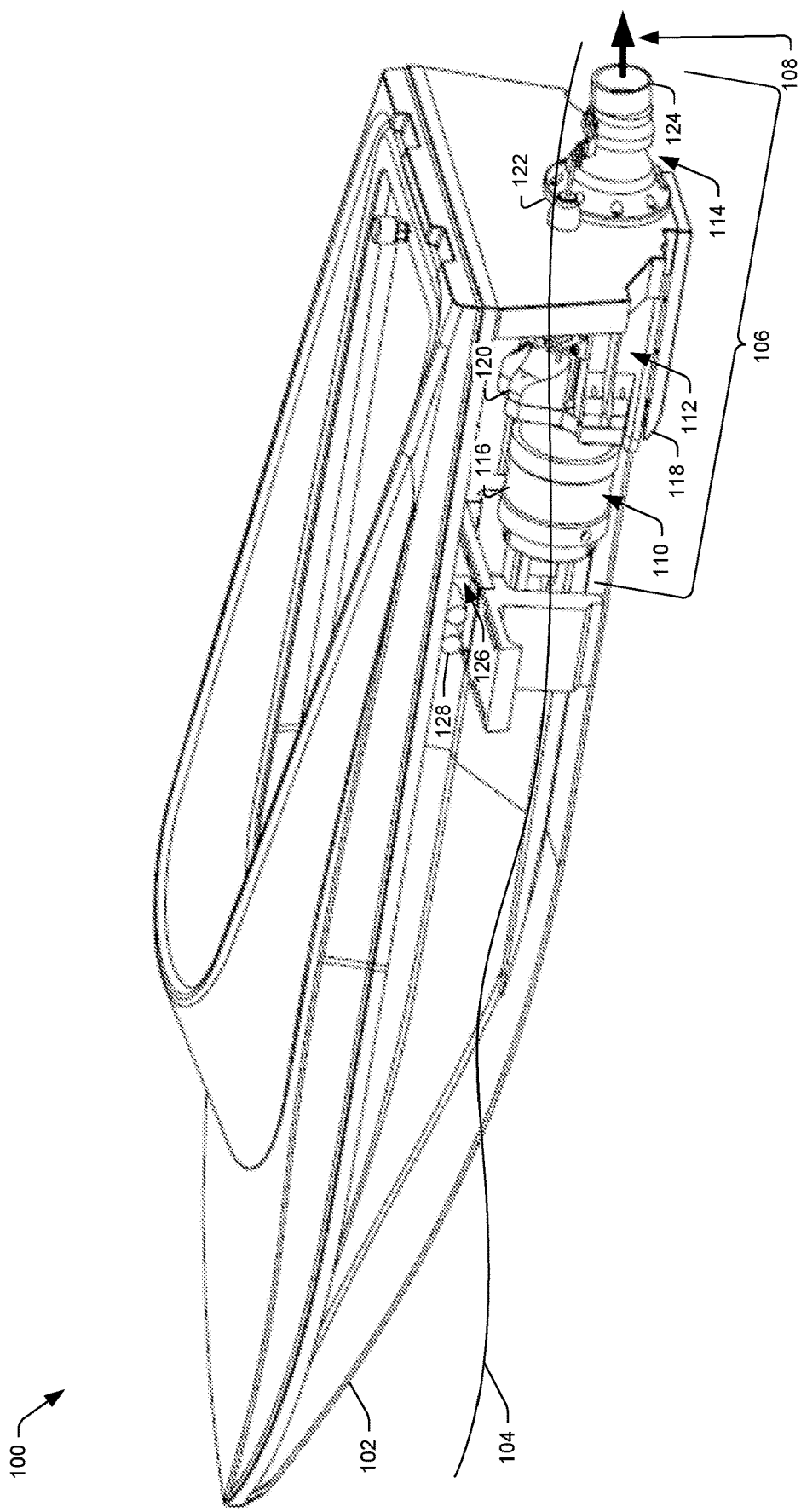
FIG. 1 illustrates an example water environment involving a vessel capable of floating or submerging in water.

This disclosure is directed to pump assemblies for creating a jet of water. For example, the pump assemblies may be arranged with a vessel capable of floating or submerging in water and may create a jet of water using the water the vessel is floating or submerged in. For example, the vessel may be a hull of a remote control (RC) boat, and the pump assembly may create a jet of water to displace the RC boat in the water.

Moreover, the pump assembly may employ a motor including a rotor having a shaft formed substantially of a single unit of material. The shaft may be coupled to an impeller without using a coupling, a universal coupling, a joint, a universal joint, etc., and the impeller may have a bearing surface received by a cooperating bearing surface arranged in a nozzle. In this way, the pump assemblies are capable of reaching high rotation rates above about 25,000 revolutions per minute (rpm) for sustained periods of time. While this application describes various embodiments of pump assemblies used in the field of RC boats, this is by way of example and not limitation. For example, the pump assemblies may be used in other fields such as game and/or toy applications (e.g., water guns, water blasters, water soakers, etc.), industrial applications, medical applications, etc.

The pump assemblies may include a first body including a front surface opposite a back surface and at least a portion of a cavity arranged between the front surface of the first body and the back surface of the first body. For example, the first body may be a housing, a pump housing, a manifold, a pump manifold, etc. and the cavity may be water intake, where at least a portion of the water intake is arranged between the front surface of the housing and the back surface of the housing. In one example, the first body may be 3D printed (i.e., additively manufactured (AM)). In another example, the first body may be molded (e.g., injection molded, extrusion molded, compression molded, etc.). The first body may be formed of a substantially single unitary unit of material (e.g., plastic, metal, composite, etc.).

Further, the pump assemblies may include a motor arranged adjacent to the front surface of the first body. The motor may include a rotor having a shaft extending from the motor and through the first body. The shaft of the rotor may include a substantially single unit of material and have an end arranged adjacent to the back surface of the first body. For example, the shaft of the rotor may include a substantially single unitary unit of metal (e.g., steel, aluminum, brass, titanium, etc.), and have an end arranged adjacent to the back surface of the first body coupled to an impeller. In one example, the rotor may include magnets fixed to an end of the shaft that cooperate with a stator of the motor. In the example where the rotor includes magnets fixed to an end of the shaft, the magnets and the shaft may be balanced as an assembly. For example, the rotor, including the magnets and the shaft formed of a substantially single unitary unit of material, may be dynamically balanced (e.g., spin balanced) relative to a longitudinal axis of the rotor assembly.

The impeller may include a bearing surface. In one example, the bearing surface may extend from a rear surface of the impeller opposite a front surface of the impeller. In another example, the bearing surface may comprise a protrusion having a substantially cylindrical shape extending from the rear surface of the impeller opposite the front surface of the impeller. The bearing surface may be received by a cooperating bearing surface arranged in a second body. For example, the bearing surface may be received by a receptacle arranged in an inlet of a nozzle. The bearing surface of the impeller and the cooperating bearing surface of the second body may support the impeller rotationally on the shaft of rotor such that when the rotor is rotatably displaced by the motor, the impeller displaces water into the cavity arranged between the front surface of the first body and the back surface of the first body and into the second body to create the jet of water.

In the example where the bearing surface may be received by a receptacle arranged in an inlet of a nozzle, the nozzle may include an aperture arranged in an end of the receptacle arranged in the inlet of the nozzle, and a gap may be arranged between the bearing surface extending from the rear surface of the impeller and the receptacle arranged in the inlet of the nozzle. The gap and the aperture arranged in the end of the receptacle arranged in the inlet of the nozzle to provide for water to be displaced across the bearing surface of the impeller to receive heat from the bearing surface of the impeller or heat from the receptacle arranged in the inlet of the nozzle when the impeller is rotationally displaced. For example, when the impeller is rotationally displaced, the impeller displaces water across the bearing surface of the impeller through the gap, and through the aperture arranged in the end of the receptacle arranged in the inlet of the nozzle, the water displaced across the bearing surface of the impeller and through the aperture receiving heat from the rotating bearing surface of the impeller or heat from the receptacle arranged in the inlet of the nozzle.

Illustrative Pump Assemblies

FIG. 1 illustrates an example water environment 100 involving a vessel 102 capable of floating or submerging in water 104. For example, the water environment 100 may be a body of water (e.g., a lake, a pond, a pool, a puddle, a river, a stream, an ocean, etc.) and the vessel 102 may be a hull of a boat (e.g., remote control (RC) boat). FIG. 1 illustrates a pump assembly 106 may be arranged with the vessel 102 for creating a jet of water 108 that displaces the vessel 102 in the water 104. For example, the pump assembly 106 may include a motor assembly 110 arranged in the vessel, a housing assembly 112 arranged with the vessel, and a nozzle assembly 114 arranged with the vessel.

The motor assembly 110 may include a heat exchanger 116 for cooling a motor (e.g., an electric motor) of the motor assembly 110. The housing assembly 112 may include a water intake port 118 that provides for the water 104 to be displaced into a first body 120 (e.g., a housing, a pump housing, a manifold, a pump manifold, etc.). The nozzle assembly 114 may include a nozzle 122 that receives the water 104 displaced into the first body 120 to form the jet of water 108. The nozzle assembly 114 may include a steering nozzle 124 that directs the jet of water 108.

The pump assembly 106 may include electronics 126 and a heat exchanger 128 for cooling the electronics 126. The electronics 126 may be an electronic controller for controlling the electric motor of the pump assembly 106 and/or the steering nozzle 124. A battery (not shown) may be arranged in the vessel 102 for providing electric power to the pump assembly 106.

While FIG. 1 illustrates a water environment 100 where the pump assembly 106 is arranged with a vessel capable of floating in the water 104, other types of water environments may occur. For example, a water environment may occur where the pump assembly 106 may be arranged in a vessel capable of submerging in the water 104. In another example, a water environment may occur where the pump assembly 106 may be arranged in a vessel capable of submerging in a container (e.g., a tank, a bladder, a reservoir, etc.).

Figure 2:
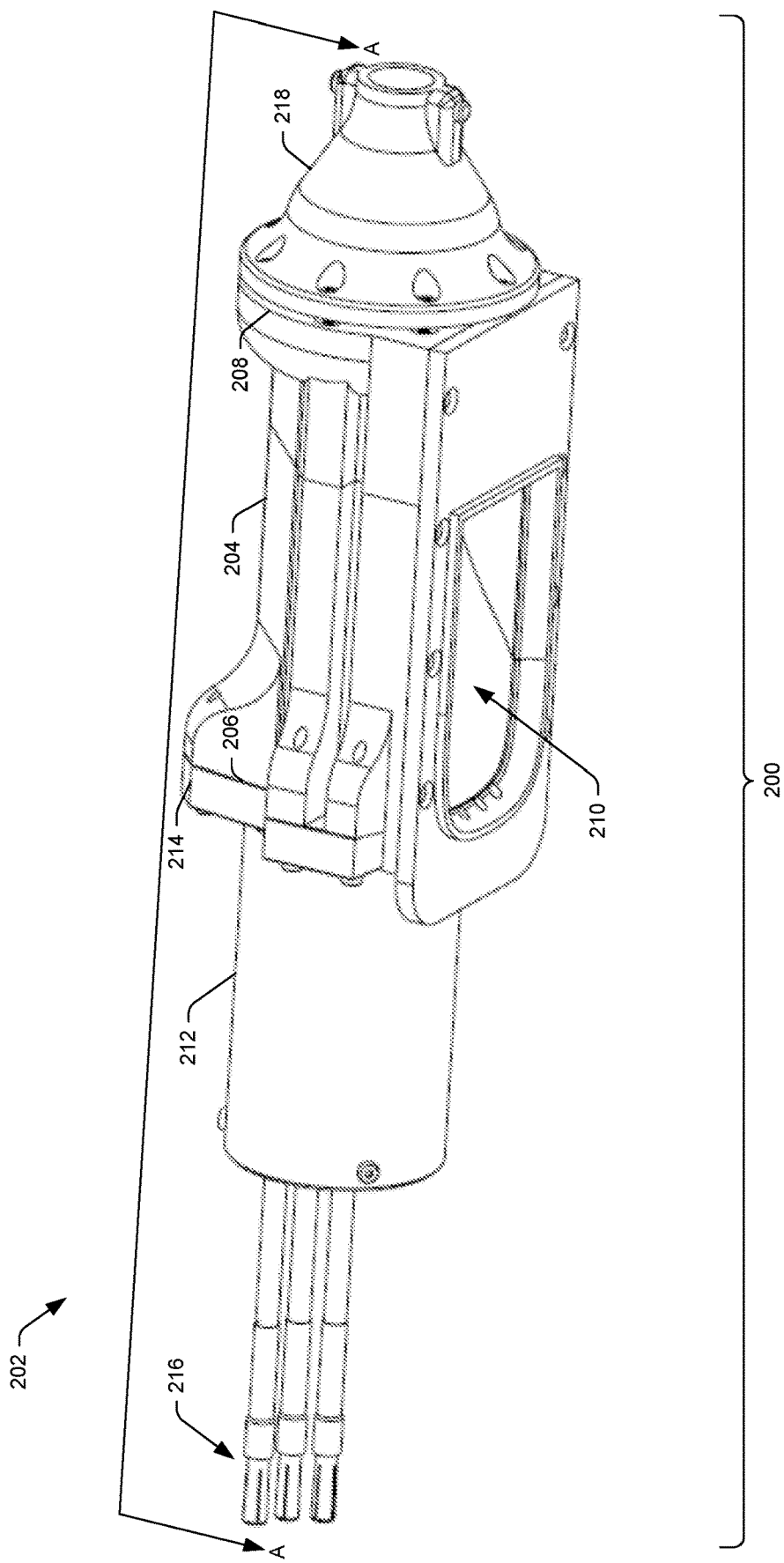
FIG. 2 illustrates a perspective view of an example pump assembly for creating a jet of water.

FIG. 2 illustrates a perspective view 200 of an example pump assembly 202 for creating the jet of water 108 shown in FIG. 1. The pump assembly 202 can be the pump assembly 106 shown in FIG. 1. FIG. 2 illustrates the pump assembly 202 may include a first body 204 having a front surface 206 and a back surface 208 opposite the front surface 206. The first body 204 may be a housing, a pump housing, a manifold, a pump manifold, etc. FIG. 2 illustrates at least a portion of a cavity 210 arranged between the front surface 206 of the first body 204 and the back surface 208 of the first body 204.

A motor 212 may be arranged adjacent to the front surface 206 of the first body 204. For example, an end of the motor 212 may be arranged adjacent to a plate 214 arranged between the front surface 206 of the first body 204 and the motor 212 arranged adjacent to the front surface 206 of the first body 204. The motor 212 may be an electric motor and receive power from one or more batteries (not shown) via one or more wires 216. A second body 218 may be arranged adjacent to the back surface 208 of the first body 204. The second body 218 can be a nozzle (e.g., nozzle 122) that receives water 104 displaced into the first body 204 to form the jet of water 108.

FIG. 2 illustrates a section line A-A taken along a longitudinal axis of the pump assembly 202.

Figure 3:
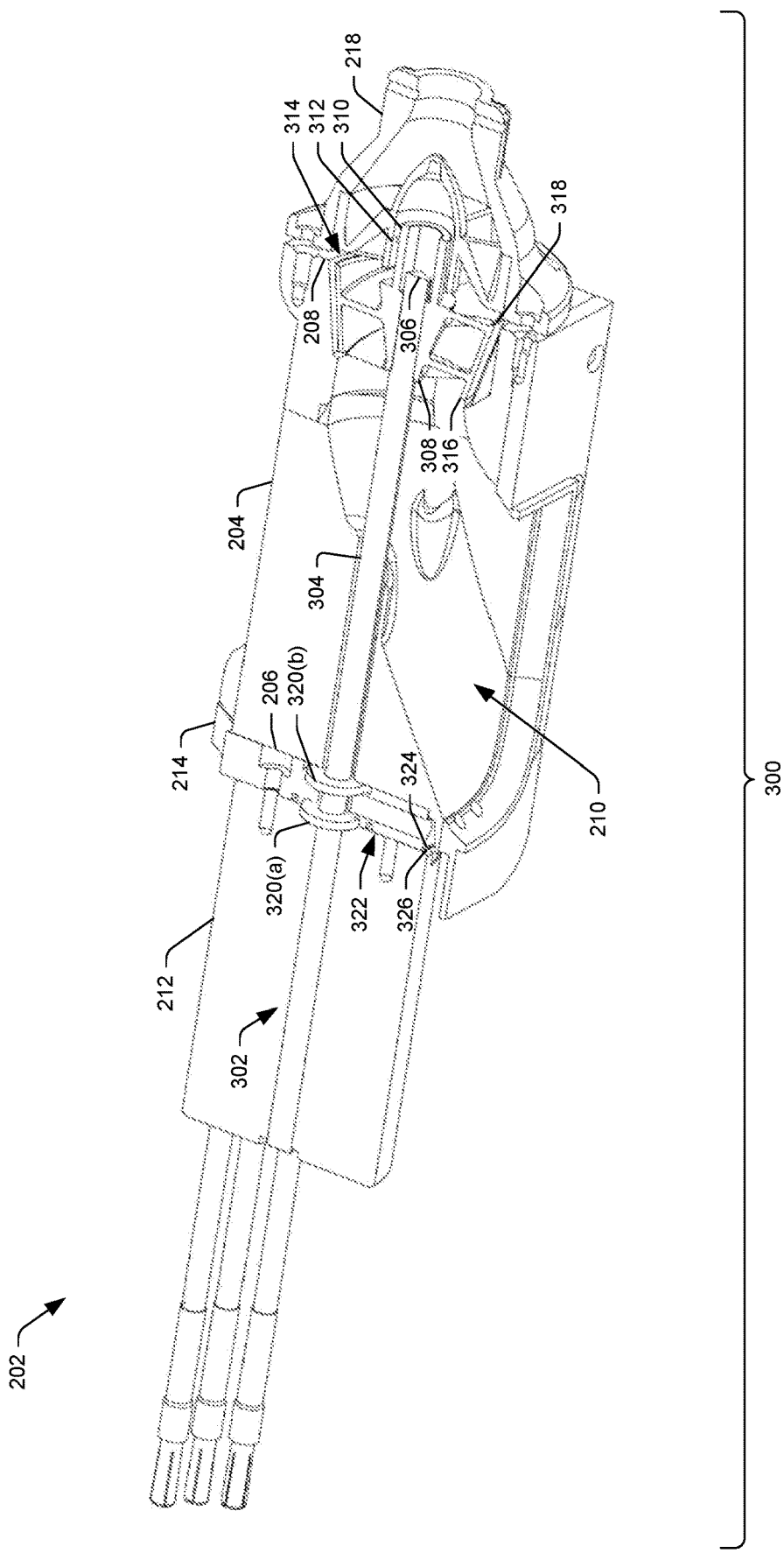
FIG. 3 illustrates a section view of the example pump assembly for creating a jet of water shown in FIG. 2.

FIG. 3 illustrates a section view 300 of the pump assembly 202 taken along the section line A-A. Section view 300 shows the motor 212 may include a rotor 302 having a shaft 304 extending from the motor 212 and through the first body 204. The shaft 304 may be a substantially single unit of material (e.g., metal, plastic, composite, etc.) and may have an end 306 arranged adjacent to the back surface 208 of the first body 204.

Section view 300 shows an impeller 308 may be fixed to the end 306 of the shaft 304. The impeller 308 may include a bearing surface 310 received by a cooperating bearing surface 312 arranged in the second body 218. As discussed above, the second body 218 may be arranged adjacent to the back surface 208 of the first body 204. The second body 218 may be a nozzle (e.g., nozzle 122) to make the jet of water 108.

The bearing surface 310 of the impeller 308, and the cooperating bearing surface 312 of the second body 218 may support the impeller 308 rotationally on the shaft 304 such that when the shaft 304 is rotatably displaced by the motor 212, the impeller 308 displaces water 104 into the cavity 210 arranged between the front surface 206 of the first body 204 and the back surface 208 of the first body 204 and into the second body 218 to create the jet of water 108.

Because the shaft 304 of the motor 212 is fixed directly to the impeller 308, and void of a coupling, a universal coupling, a joint, a universal joint etc., the shaft 304 fixed directly to the impeller does not introduce inefficiencies associated with a coupling, a universal coupling, a joint, a universal joint etc., and provides for the motor 212 to rotate the shaft 304 above about 25,000 rpm. In another example, because the shaft 304 of the motor 212 is fixed directly to the impeller 308, this may provide for the motor 212 to rotate the shaft 304 at about 30,000 rpm. In another example, because the shaft 304 of the motor 212 is fixed directly to the impeller 308, this may provide for the motor 212 to rotate the shaft 304 up to at about 40,000 rpm.

Further, because the shaft 304 is fixed directly to the impeller 308 that is supported in the second body 218, the shaft 304 is not cantilevered (e.g., supported at one end and not supported at the other end). Rather, the shaft 304 is supported by the motor 212 (e.g., bearings of the motor) at one end and supported by the impeller 308 at the other end 306. Because, the shaft 304 is supported at the ends and is not cantilevered, the shaft 304 does not introduce inefficiencies at least at the end 306 of the shaft 304 coupled to the impeller 308 and provides for the motor 212 to rotate the shaft 304 above about 25,000 rpm.

Section view 300 shows the first body 204 may include a cooperating receptacle 314 arranged in the back surface 208 of the first body 204. The cooperating receptacle 314 may be communicatively coupled to the cavity 210 arranged between the front surface 206 of the first body 204 and the back surface 208 of the first body 204. For example, the cooperating receptacle 314 may have an open end arranged in the cavity 210 to provide for water to be displaced from the cavity into the cooperating receptacle 314. Section view 300 shows at least a portion of the impeller 308 may be received by the cooperating receptacle 314 arranged in the back surface 208 of the first body 204. For example, the impeller 308 may include a front surface 316 and a back surface 318 opposite the front surface 316, and the front surface 316 of the impeller 308 may be received by the cooperating receptacle 314 arranged in the back surface 208 of the first body 204.

Section view 300 shows gaskets 320(a) and 320(b) may be arranged around the shaft 304 extending from the motor 212. The gasket 320(a) may provide for sealing an interface 322 between a sealing surface 324 of the plate 214 and a surface 326 of the motor 212. The gasket 320(b) may provide for sealing an interface between a sealing surface of the plate and the back surface 318 of the first body 204.

Figure 4:
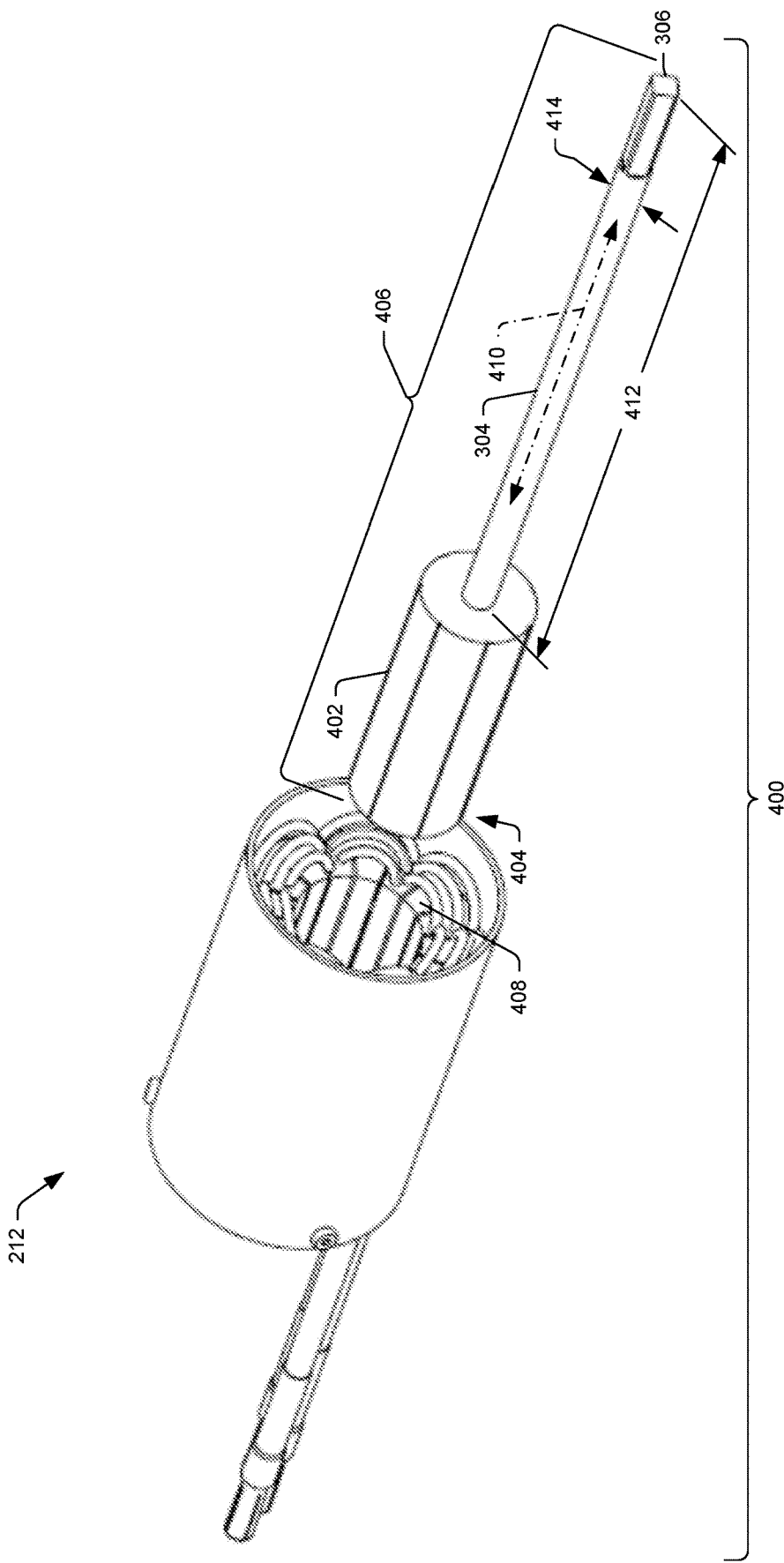
FIG. 4 illustrates an exploded assembly view of the motor shown in FIGS. 2 and 3.

FIG. 4 illustrates an exploded assembly view 400 of the motor 212 shown in FIGS. 2 and 3. The exploded assembly view 400 of the motor 212 shows the shaft 304 may include a substantially single unitary unit of metal (e.g., steel, aluminum, brass, titanium, etc.) having one or more magnets 402 fixed to an end 404 of the shaft 304 opposite the end 306. The shaft 304 and the one or more magnets 402 defining a rotor 406 of the motor 212. The rotor 406 can be the rotor 302 shown in FIG. 3. The rotor 406 to cooperate with a stator 408 of the motor 212 to rotatably displace the rotor 406. The rotor 406, including the one or more magnets 402 and the shaft 304, may be dynamically balanced (e.g., spin balanced) relative to a longitudinal axis 410 of the rotor 406. In one example, the shaft 304 may have a length 412 of about 4 inches (100 millimeters) extending from the magnets 402 to the end 306 of the shaft 304. In another example, the shaft 304 may have a length 412 of at least about 2 inches (50 millimeters) to at most about 10 inches (254 millimeters). The shaft 304 may have an outside diameter 414 of about 0.2 inches (5 millimeters). In another example, the shaft 304 may have an outside diameter 414 of at least about 0.1 inches (3 millimeters) to at most about 0.4 inches (9 millimeters). For example, the shaft 304 may have an outside diameter 414 of at least about 0.1 inches (3 millimeters) to at most about 0.4 inches (9 millimeters) for displacing remote control (RC) boats. In another example, the shaft 304 may have an outside diameter 414 of about 0.8 inches (20 millimeters). For example, the motor 212 and shaft 304 may be scaled up so that the shaft 304 has an outside diameter 414 of about 0.8 inches (20 millimeters) to provide for displacing other vessels. For example, the motor 212 and shaft 304 may be scaled up to provide for displacing a powered body board, a powered surfboard, a powered paddle board, a powered kayak, etc. In another example, the length 412 and outside diameter 414 of the shaft 304 may have a size ratio (i.e., length of the shaft divided by outside diameter of the shaft) of about 20.3 to provide for scaling to the requirements of larger and smaller sized pumps (e.g., larger and smaller pump assembly 106).

While the exploded assembly view 400 shows the end 306 of the shaft 304 having a rectangular cross-sectional shape to provide for fixing the end 306 of the shaft 304 to the impeller 308, other shapes are contemplated for fixing the end 306 of the shaft 304 to the impeller 308. For example, the end 306 of the shaft 304 may have a triangular cross-sectional shape, a circular cross-sectional shape, a conical cross-sectional shape, etc. for fixing the end 306 of the shaft 304 to the impeller 308. Moreover, the end 306 of the shaft 304 may have a boss, a nodule, a ridge, a protrusion for fixing the end 306 of the shaft 304 to the impeller 308. Further, the end 306 of the shaft 304 may have a notch, a groove, a pocket for fixing the end 306 of the shaft 304 to the impeller 308.

Figure 5:
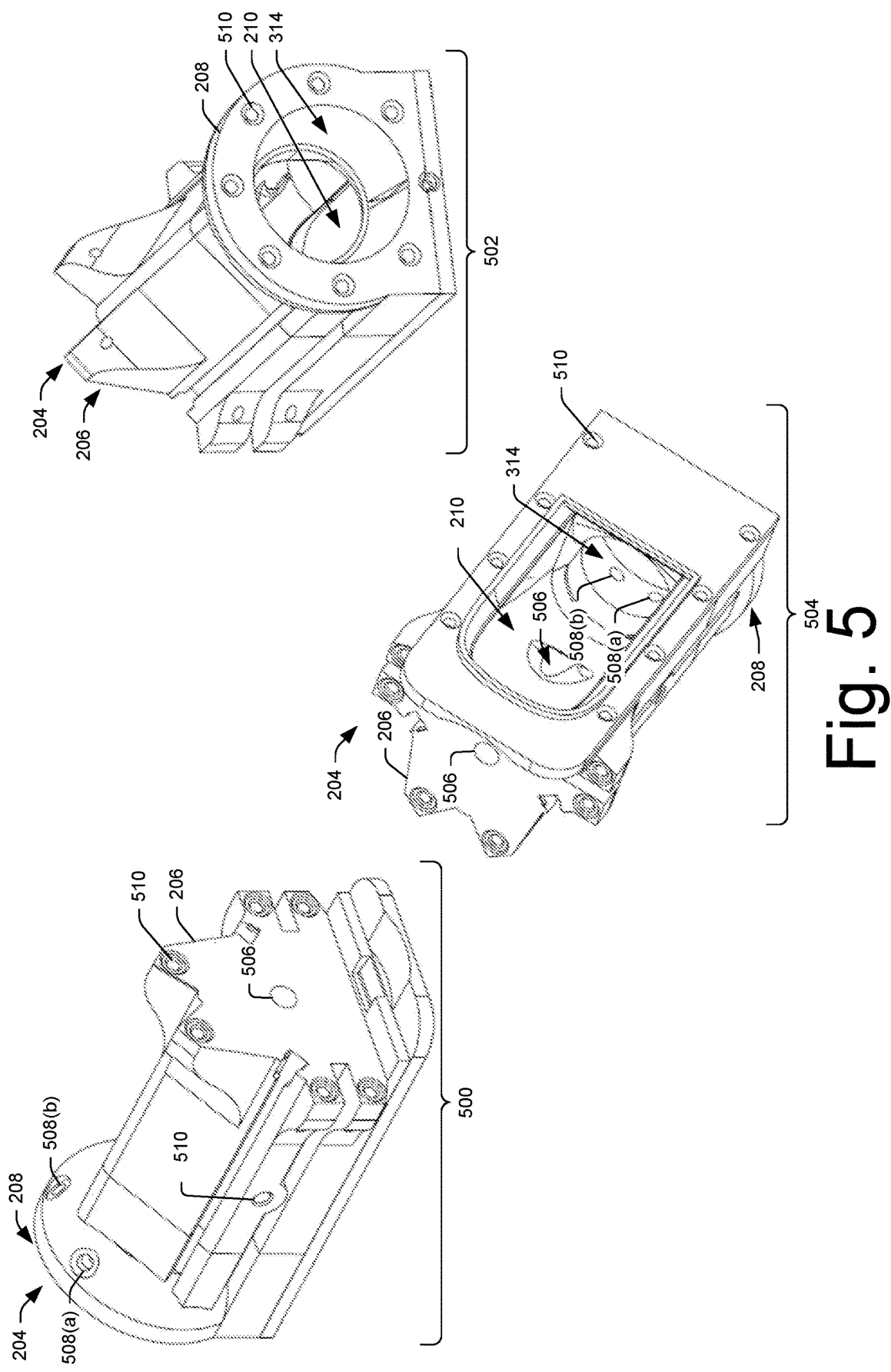
FIG. 5 illustrates a front perspective view, a back perspective view, and a bottom perspective view of the first body shown in FIGS. 2 and 3.

FIG. 5 illustrates a front perspective view 500, a back perspective view 502, and a bottom perspective view 504 of the first body 204 shown in FIGS. 2 and 3. While FIG. 5 shows the first body 204 may be formed separately from the vessel 102, the first body 204 and the vessel 102 may be formed together of a substantially single unitary unit of material (e.g., plastic, metal, composite, etc.). For example, the first body 204 and the vessel 102 (e.g., hull of a boat) may be 3D printed (i.e., additively manufactured (AM)) as a single unit.

The first body 204 may be a housing, a pump housing, a manifold, a pump manifold, etc. and the cavity 210 may be a water intake, where at least a portion of the water intake is arranged between the front surface 206 of the housing and the back surface 208 of the housing. In one example, the first body 204 may be 3D printed (i.e., additively manufactured (AM)). In another example, the first body 204 may be molded (e.g., injection molded, extrusion molded, compression molded, etc.). The first body 204 may be formed of a substantially single unitary unit of material (e.g., plastic, metal, composite, etc.).

The front perspective view 500 shows the front surface 206 of the first body 204 may be a substantially planar surface to provide for interfacing with the plate 214. An aperture 506 may be arranged in the front surface 206 of the plate 214 for receiving at least a portion of the shaft 304 extending from the motor 212. For example, the aperture 506 may be a through hole from the front surface 206 of the plate 214 to the cavity 210 of the first body 204. The front perspective view 500 shows ports 508(a) and 508(b) arranged proximate to the back surface 208 of the first body 204. Each of the ports 508(a) and 508(b) may be communicatively coupled to the cooperating receptacle 314 arranged in the back surface 208 of the first body 204 to transport water from the cooperating receptacle 314 arranged in the back surface 208 of the first body 204 to a heat exchanger. The ports 508(a) and 508(b) may provide for transporting water from the cooperating receptacle 314 arranged in the back surface 208 of the first body 204 to the heat exchanger 116 for cooling a motor (e.g., electric motor) of the motor assembly 110 and/or to the heat exchanger 128 for cooling the electronics 126. The ports 508(a) and 508(b) may receive fluid fittings (e.g., hose barbs) that provide for coupling tubes to the fittings and the heat exchangers 116 and/or 128. Front perspective view 500 shows at least one port 510 arranged between the front surface 206 of the first body 204 and the back surface 208 of the first body 204. The at least one port 510 may be communicatively coupled to the cavity 210 arranged between the front surface 206 of the first body 204 and the back surface 208 of the first body 204 to transport water from an inside of the vessel 102 to the cavity 210 arranged between the front surface 206 of the first body 204 and the back surface 208 of the first body 204. For example, the at least one port 510 may transport water from an inside of a hull of a boat to the cavity 210 to drain the hull of the boat. The at least one port 510 may receive a fluid fitting (e.g., hose barbs) that provides for coupling a tube to the fitting.

Back perspective view 502 shows the back surface 208 of the first body 204 may include the cooperating receptacle 314 arranged in the back surface 208 of the first body 204 and communicatively coupled to the cavity 210 arranged between the front surface 206 of the first body 204 and the back surface 208 of the first body 204. As discussed above with regard to FIG. 3, the cooperating receptacle 314 may receive at least a portion of the impeller 308. In some examples, the cooperating receptacle 314 may receive a wear ring and at least a portion of the impeller 308. For example, a wear ring may be arranged between a surface of the cooperating receptacle 314 of the first body 204 and a surface of impeller 308 to prevent debris (e.g., sand, dirt, gravels, rocks, etc.) from abrading the surface of the cooperating receptacle 314 and/or the surface of the impeller 308.

Front perspective view 500, back perspective view 502, and bottom perspective view show a plurality of fasteners 512. The fasteners 512 arranged in the front surface 206 of the first body 204 may provide for mounting the plate 214 to the front surface 206 of the first body 204. The fasteners 512 arranged in the back surface 208 of the first body 204 may provide for mounting the second body 218 and/or the first body 204 to the vessel 102. The fasteners 512 arranged in the bottom surface of the first body 204 may provide for mounting the first body 204 to the vessel 102.

Figure 6:
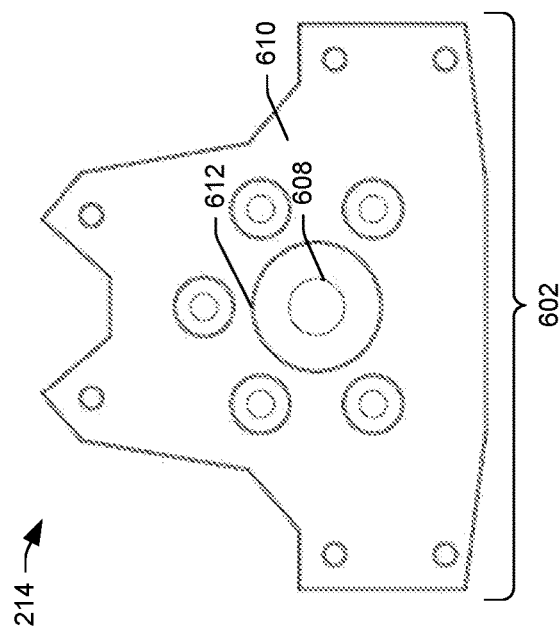
FIG. 6 illustrates a front view, a back view, and a bottom view of the plate shown in FIGS. 2 and 3.
Figure 6:
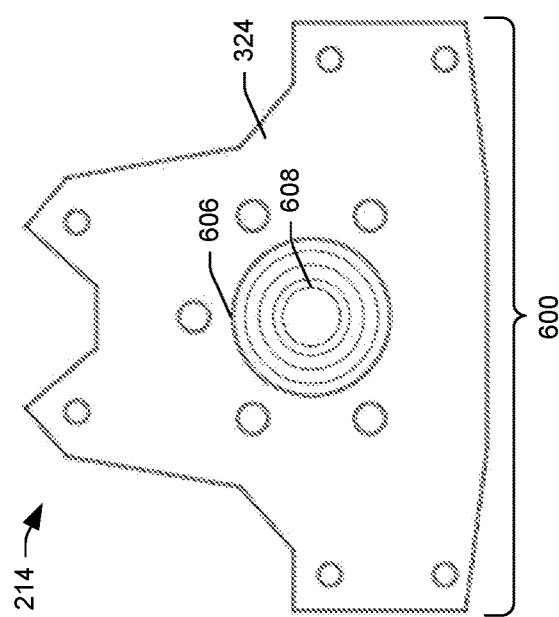
Figure 6:
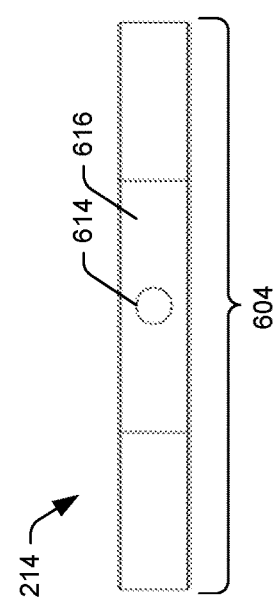

FIG. 6 illustrates a front view 600, a back view 602, and a bottom view 604 of the plate 214 shown in FIGS. 2 and 3. The front view 600 of the plate 214 shows the sealing surface 324 of the plate 214 may include a pocket 606 arranged around a through hole 608 arranged in the plate 214. The pocket 606 may be for receiving the gasket 320(a) arranged around the shaft 304 of the motor 212. For example, the pocket 606 may be an O-ring groove for receiving an O-ring arranged around the shaft 304 of the motor 212.

The back view 602 of the plate 214 shows a sealing surface 610 of the plate 214 may include a pocket 612 arranged around the through hole 608 arranged in the plate 214. The pocket 612 may be for receiving the gasket 320(b) arranged around the shaft 304 of the motor 212. For example, the pocket 612 may be an O-ring groove for receiving an O-ring arranged around the shaft 304 of the motor 212.

The bottom view 604 of the plate 214 shows the plate 214 may include a hole 614 arranged in a bottom surface 616 of the plate 214. The hole 614 may provide for water that may be contained in the through hole 608 to drain from the through hole 608 and out of the hole 614 arranged in the bottom surface 616 of the plate 214. For example, the hole 614 may be a weep hole that allows water to weep from the through hole 608 arranged in the plate 214. In one example, the plate 214 may be 3D printed (i.e., additively manufactured (AM)). In another example, the plate 214 may be molded (e.g., injection molded, extrusion molded, compression molded, etc.). The plate 214 may be formed of a substantially single unitary unit of material (e.g., plastic, metal, composite, etc.).

Figure 7:
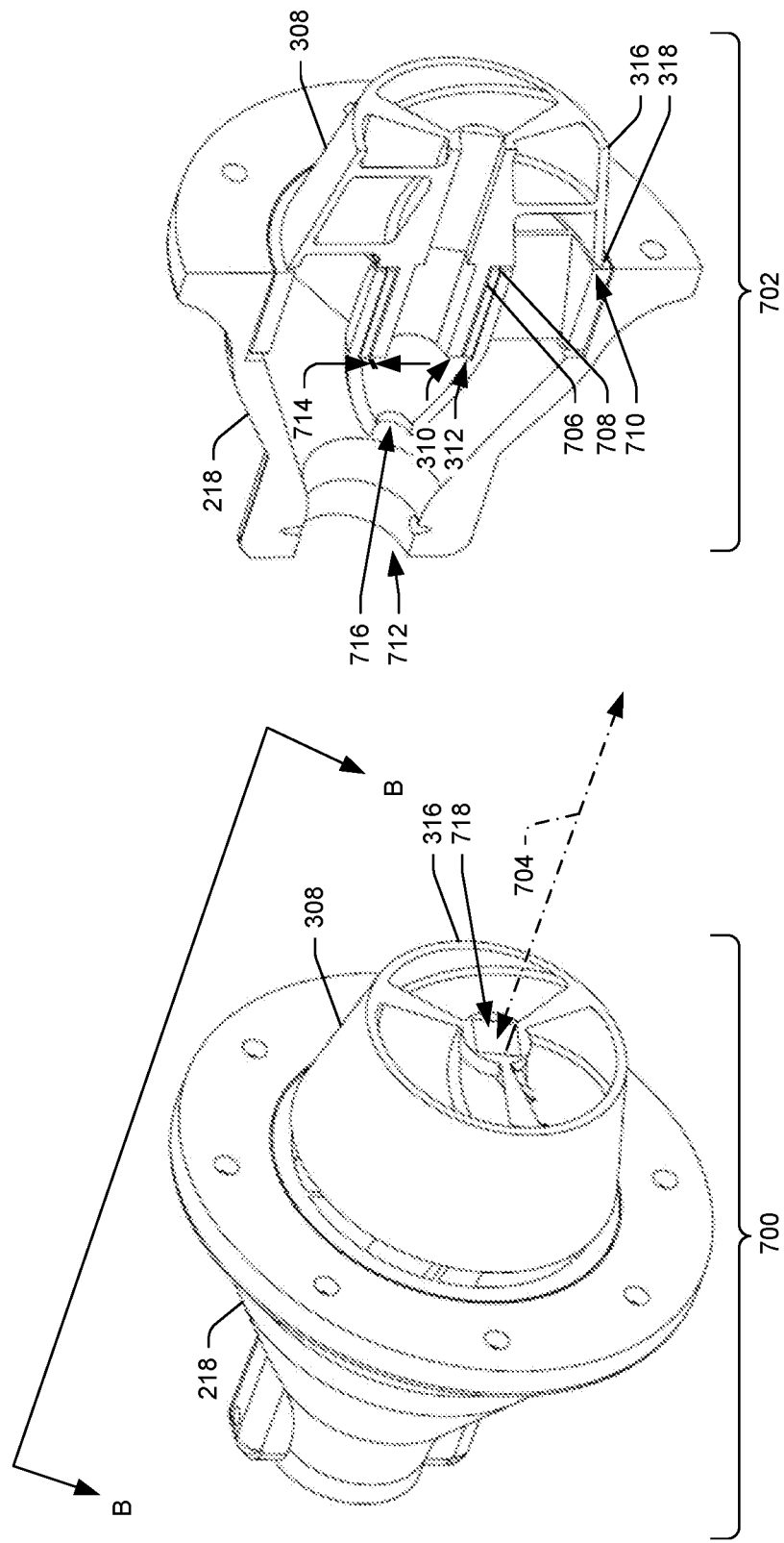
FIG. 7 illustrates a front perspective view and a section view of the impeller including the bearing surface received by the cooperating bearing surface arranged in the second body shown in FIGS. 2 and 3.

FIG. 7 illustrates a front perspective view 700 and a section view 702 of the impeller 308 including the bearing surface 310 receivable by the cooperating bearing surface 312 arranged in the second body 218 shown in FIGS. 2 and 3. The front perspective view 700 shows a section line B-B taken along a longitudinal axis 704 of the impeller 308 and the second body 218.

The section view 702 shows the cooperating bearing surface 312 of the second body 218 may include a sleeve 706 (e.g., a bushing or a bearing) fixed in a receptacle 708 arranged in an inlet 710 of the second body 218 opposite an outlet 712 of the second body 218. For example, the sleeve 706 may be press fit, snap fit, adhered (e.g., glued), threaded, pined, etc. in the receptacle 708 arranged in the inlet 710 of the second body 218. The sleeve 706 may be formed of a material harder than the bearing surface 310 of the impeller 308 and may provide for the bearing surface 310 to be rotatably displaced relative to the second body 218 and prevent the cooperating bearing surface 312 from being deteriorated or worn down by the rotating bearing surface 310 of the impeller 308. The sleeve 706 may be formed of ceramic, metal, plastic, composite, etc. having hardness greater than a hardness of a material (e.g., plastic) forming the bearing surface 310 of the impeller 308.

The section view 702 shows a gap 714 arranged between the bearing surface 310 of the impeller 308 and sleeve 706 arranged in the receptacle 708 arranged in the inlet 710 of the second body 218. For example, the bearing surface 310 of the impeller 308 may have an outside diameter less than an inside diameter of the sleeve 706 to allow water to be displaced across the bearing surface 310 of the impeller 308 through the gap 714 between the bearing surface 310 of the impeller 308 and the sleeve 706 arranged in the receptacle 708 of the second body 218. In the example where the cooperating bearing surface 312 of the second body 218 does not include the sleeve 706 fixed in the receptacle 708 of the second body 218, the gap 714 may be between the bearing surface 310 of the impeller 308 and the receptacle 708 arranged in the inlet 710 of the second body 218. For example, the bearing surface 310 of the impeller 308 may have an outside diameter less than an inside diameter of the receptacle 708 to allow water to be displaced across the bearing surface 310 of the impeller 308 through the gap 714 between the bearing surface 310 of the impeller 308 and the receptacle 708 arranged in the inlet 710 of the second body 218. The gap 714 may be at least about 0.002 inches (0.05 millimeters) to at most about 0.06 inches (1.5 millimeters).

While FIG. 7 illustrates the second body 218 may include two separate parts (i.e., a thrust cone and a diverter) assembled together, the second body 218 may be a one piece thrust cone with an integral diverter which houses the sleeve 706. For example, the second body 218 may be a thrust cone and diverter formed of a substantially single unitary unit of material (e.g., plastic, metal, composite, etc.), and the sleeve 706 may be fixed in a receptacle arranged in the inlet of the thrust cone. In the example where the second body 218 may include two separate parts (i.e., a thrust cone and a diverter) assembled together, the thrust cone may be formed of metal and the diverter may be formed of a plastic. In the example where the thrust cone may be formed of metal and the diverter may be formed of plastic, the diverter may be press fit, snap fit, adhered (e.g., glued), threaded, pined, etc. in the thrust cone.

The section view 702 shows an aperture 716 arranged in an end of the receptacle 708 arranged in the inlet 710 of the second body 218. The aperture 716 arranged in the end of the receptacle 708 may provide for the water being displaced across the bearing surface 310 of the impeller 308 to exit the receptacle 708 arranged in the inlet 710 of the second body 218.

The front perspective view 700 shows a cooperating receptacle 718 arranged in the front surface 316 of the impeller 308 for fixing the impeller 308 to the end 306 of the shaft 304 of the motor 212. When the impeller 308 is rotationally displaced by the shaft 304 of the motor 212, the impeller 308 displaces at least a portion of the water across the bearing surface 310 of the impeller 308 through the gap 714, and through the aperture 716 arranged in the end of the receptacle 708 arranged in the inlet 710 of the second body 218 (e.g., nozzle), the water displaced across the bearing surface 310 of the impeller 308 and through the aperture 716 to receive heat from the bearing surface 310 of the impeller 308 or heat from the receptacle 708 arranged in the inlet 710 of the second body 218. In the example where the sleeve 706 is fixed in the receptacle 708 of the second body 218, the water displaced across the bearing surface 310 of the impeller 308 and through the aperture 716 may receive heat from the bearing surface 310 of the impeller 308 or heat from the sleeve 706 fixed in the receptacle 708 of the second body 218. The heat may be caused by friction. For example, the rotation of the impeller 308 may result in friction between the bearing surface 310 of the impeller 308 and the receptacle 708 or the sleeve 706.

While the front perspective view 700 shows the cooperating receptacle 718 having a rectangular cross-sectional shape to provide for fixing the end 306 of the shaft 304 to the impeller 308, other shapes are contemplated for fixing the end 306 of the shaft 304 to the impeller 308. For example, the cooperating receptacle 718 may have a triangular cross-sectional shape, a circular cross-sectional shape, a conical cross-sectional shape, etc. for fixing the end 306 of the shaft 304 to the impeller 308. Moreover, the cooperating receptacle 718 may have a boss, a nodule, a ridge, a protrusion for fixing the end 306 of the shaft 304 to the impeller 308. Further, the cooperating receptacle 718 may have a notch, a groove, a pocket for fixing the end 306 of the shaft 304 to the impeller 308.

In one example, the second body 218 may be 3D printed (i.e., additively manufactured (AM)). In another example, the second body 218 may be molded (e.g., injection molded, extrusion molded, compression molded, etc.). The second body 218 may be formed of a substantially single unitary unit of material (e.g., plastic, metal, composite, etc.).

In one example, the impeller 308 may be 3D printed (i.e., additively manufactured (AM)). In another example, the impeller 308 may be molded (e.g., injection molded, extrusion molded, compression molded, etc.). The impeller 308 may be formed of a substantially single unitary unit of material (e.g., plastic, metal, composite, etc.).

Figure 8:
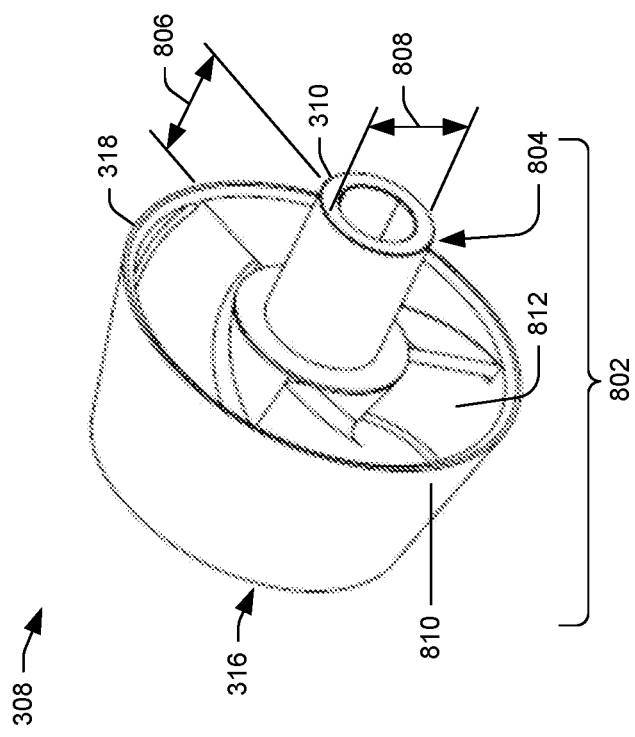
FIG. 8 illustrates a front perspective view and a back perspective view of the impeller shown in FIGS. 3 and 7.
Figure 8:
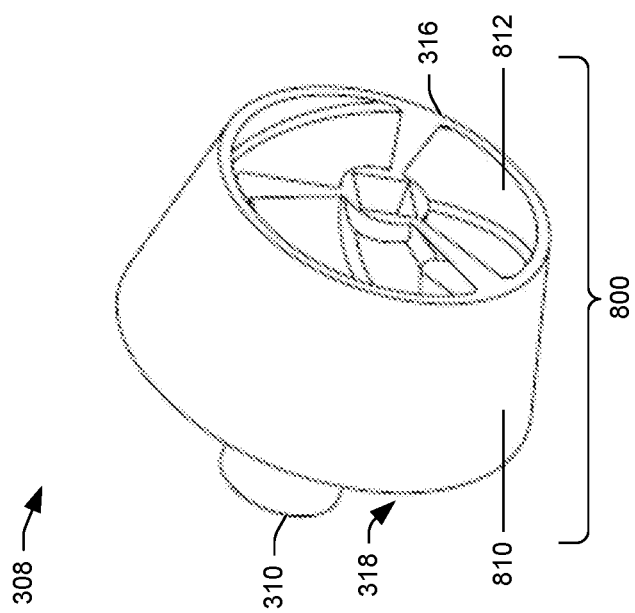

FIG. 8 illustrates a front perspective view 800 of the impeller 308 and a back perspective view 802 of the impeller 308 shown in FIGS. 3 and 7. The front perspective view 800 and the back perspective view 802 show the bearing surface 310 extending from the back surface 318 of the impeller 308 opposite the front surface 316 of the impeller 308. The back perspective view 802 shows the bearing surface 310 of the impeller 308 may comprises a protrusion 804 having a substantially cylindrical shape receivable by the cooperating bearing surface 312 arranged in the second body 218. The bearing surface 310 may extend a distance 806 of at least about 0.25 inches (6.3 millimeters) to at most about 1 inch (25 millimeters) from the back surface 318. The bearing surface 310 may have an outside diameter 808 of at least about 0.2 inches (5 millimeters) to at most about 2 inches (50 millimeters). While FIG. 8 illustrates the bearing surface 310 may have an outside diameter 808 of at least about 0.2 inches (5 millimeters) to at most about 2 inches (50 millimeters), the bearing surface 310 may be scaled up beyond an outside diameter of about 2 inches (50 millimeters). For example, a pump assembly (e.g., pump assembly 106) may be scaled up to requirements of larger sized pumps, and thus the impeller 308 may be scaled up to the requirements of the larger sized pumps. In the example, where the pump assembly 106 may be scaled up to requirements of larger sized pumps, the larger sized pumps may be scaled up to provide for displacing a powered body board, a powered surfboard, a powered paddle board, a powered kayak, etc.

The front perspective view 800 and the back perspective view 802 show the impeller 308 may include an exterior surface 810 opposite an interior surface 812 arranged between the back surface 318 of the impeller 308 opposite the front surface 316 of the impeller 308. The exterior surface 810 of the impeller 308 may comprise a substantially conical shape, and at least a portion of the exterior surface 810 comprising the substantially conical shape may be receivable by the cooperating receptacle 314 arranged in the back surface 208 of the first body 204.

The front perspective view 800 and the back perspective view 802 show the impeller 308 may include blades 814 arranged from the front surface 316 to the back surface 318 of impeller 308. The blades 814 may provide for displacing water from the front surface 316 of the impeller 308 to the back surface 318 of the impeller 308.

Figure 9:
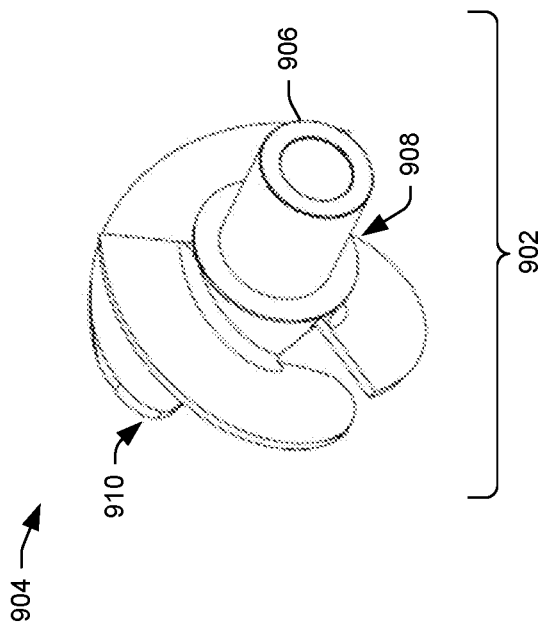
FIG. 9 illustrates a front perspective view and a back perspective view of another example impeller.
Figure 9:
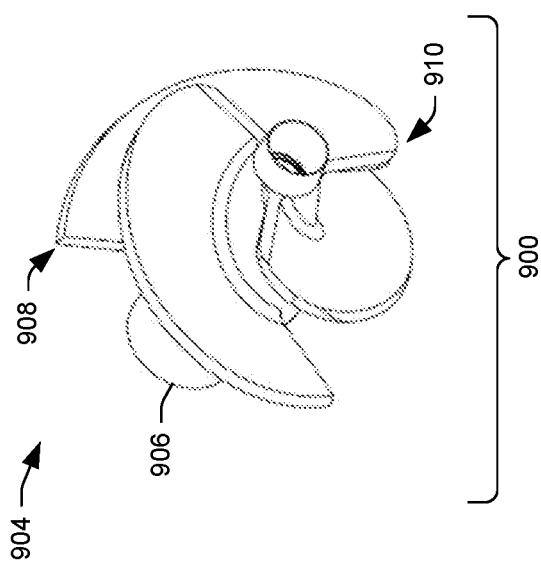

FIG. 9 illustrates a front perspective view 900 and a back perspective view 902 of another example impeller 904. The front perspective view 900 and the back perspective view 902 show a bearing surface 906 extending from a back surface 908 of the impeller 904 opposite a front surface 910 of the impeller 308. The bearing surface 906 can be the bearing surface 310. The front perspective view 900 and the back perspective view 902 show the impeller 904 is void of an exterior surface (e.g., exterior surface 810 shown in FIG. 8). In one example, the impeller 904 may be 3D printed (i.e., additively manufactured (AM)). In another example, the impeller 904 may be molded (e.g., injection molded, extrusion molded, compression molded, etc.). The impeller 904 may be formed of a substantially single unitary unit of material (e.g., plastic, metal, composite, etc.).

Example Pump Assemblies

FIGS. 10A, 10B, 11A, and 11B illustrates other example pump assemblies 1000 and 1002 for creating a jet of water. Similar to the pump assemblies 106 and 202 discussed above, the pump assemblies 1000 and 1002 may be arranged with a vessel 102 for creating a jet of water 108 that displaces the vessel 102 in the water 104. Inasmuch as FIGS. 10A, 10B, 11A, and 11B depict specific elements and features of the pump assemblies 1000 and 1002, while referring to the same elements and features of the pump assemblies 106 and 202, the following discussion of the specific elements and features of the pump assemblies 1000 and 1002 may refer interchangeably to either or both of pump assemblies 106 and 202 illustrated in FIGS. 1, 2, and 3 except where explicitly indicated. In particular, FIGS. 10A, 10B, 11A, and 11B illustrate the pump assemblies 1000 and 1002 may include a motor assembly 110, a motor 212, a first body 204, and a second body 218. Further, while FIG. 1 illustrates the vessel 102 comprising a hull of a boat (e.g., remote control (RC) boat), the vessel may be a recreational watercraft (e.g., a jet ski, a surfboard, a hydrofoil surfboard, a hydrofoil, etc.), a remote controlled watercraft (e.g., a remote controlled jet ski, remote controlled surfboard, a remote controlled hydrofoil surfboard, a remote controlled hydrofoil, etc.), etc. Moreover, the pump assemblies 1000 and 1002 may be arranged with a structure (e.g., a dock, a tank, a canal, a pipe, a hose, a fountain, etc.) for creating a jet of a fluid (e.g., river water, lake water, seawater, potable water, liquid waste, liquid chemicals, alcohol, wine, beer, etc.).

Figure 10A:
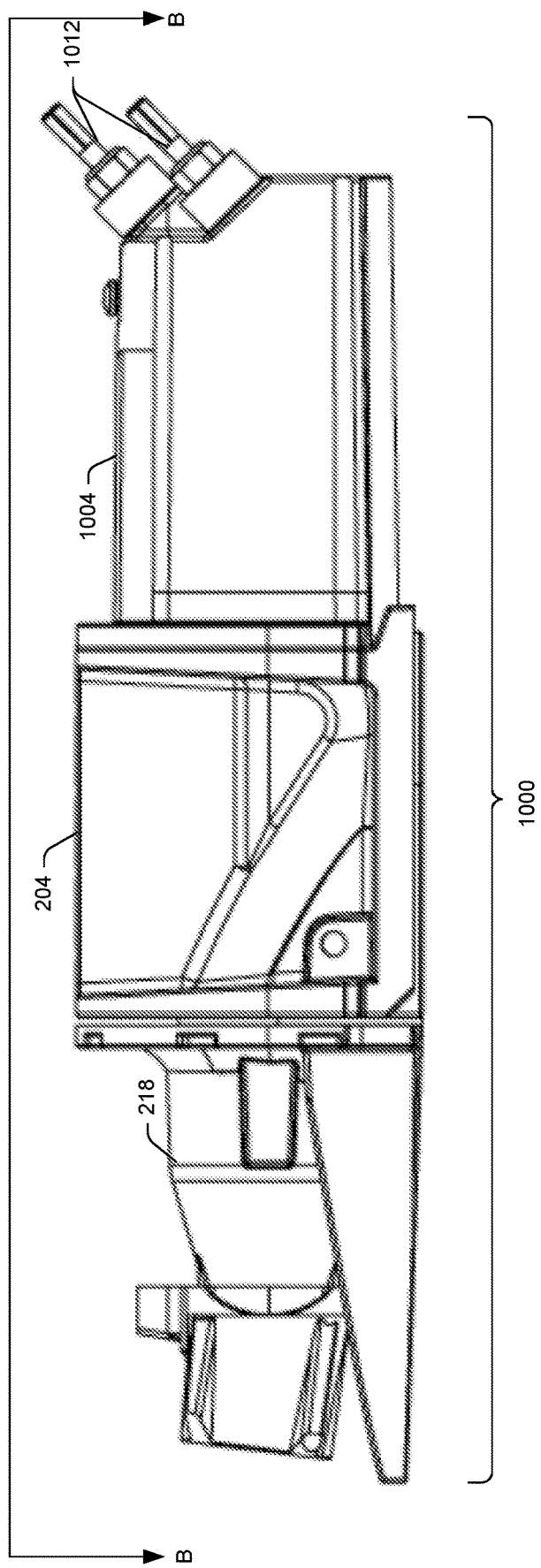
FIG. 10A illustrates a perspective view of another example pump assembly for creating a jet of water.

FIG. 10A illustrates a section line B-B taken along a longitudinal axis of the pump assembly 1000 and FIG. 11A illustrates a section line C-C taken along a longitudinal axis of the pump assembly 1002.

FIGS. 10A, 10B, 11A, and 11B illustrate an enclosure 1004 that protects the motor 212 arranged in the enclosure 1004 from a fluid. In one example, the fluid may be the water 104 described above and illustrated in FIG. 1, and the enclosure 1004 protects the motor 212 from the water 104. For example, the fluid may be seawater and the enclosure 1004 protects the motor 212 from the seawater. In another example, the fluid may be potable water, liquid waste, liquid chemicals, alcohol, wine, beer, etc., and the enclosure protects the motor from the potable water, liquid waste, liquid chemicals, alcohol, wine, beer, etc. A dielectric fluid (not shown) may be containable in a cavity 1006 of the enclosure 1004 to immerse the motor 212 in the dielectric fluid for preventing corrosion of the motor 212 from the fluid. For example, a relatively small amount of the fluid may ingress around seals associated with the pump assemblies 1000 and 1002 and the dielectric fluid contained in the cavity 1006 of the enclosure 1004 prevents the relatively small amount of the fluid that ingresses into the cavity 1006 from corroding of the motor 212. The dielectric fluid may dissolve the fluid that ingresses into the cavity 1006 and prevents the fluid from being volatile. The dielectric fluid contained in the cavity 1006 may be emptied or removed from the cavity 1006 and replaced with fresh dielectric fluid. For example, the dielectric fluid contained in the cavity 1006 may have a limited life span and may need to be changed according to a maintenance schedule associated with the pump assemblies 1000 and 1002. In one example, the dielectric fluid may be emptied or removed from the cavity 1006 via removing the enclosure 1004 from the pump assemblies 1000 and 1002. In another example, the dielectric fluid may be emptied or removed from the cavity via one or more fluid fittings (e.g., hose bards) (not shown) arranged with the enclosure 1004. In another example, the dielectric fluid may be emptied or removed from the cavity 1006 via one or more drain plugs arranged with the enclosure 1004.

In one example, the enclosure 1004 may be formed of a plastic. In one example, the plastic may be transparent for providing a user with a visual of the motor 212 submerged in the dielectric fluid contained in the cavity 1006. In another example, at least a portion of the plastic forming the enclosure 1004 may be transparent for providing a user with a visual of the motor 212 submerged in the dielectric fluid. The enclosure 1004 may have a front surface 1008 opposite a back surface 1010. The cavity may be arranged between the front surface 1008 and the back surface 1010. The back surface 1010 of the enclosure 1004 may be arrangeable adjacent to a front surface of a body. For example, the back surface 1010 of the enclosure 1004 may be arrangeable adjacent to the front surface 206 of the first body 204. While FIGS. 10A and 10B illustrate the back surface 1010 of the enclosure 1004 may be arranged adjacent to the front surface 206 of the first body 204, the back surface 1010 of the enclosure 1004 may be arrangeable adjacent to a surface of a structure (e.g., a dock, a tank, a canal, a pipe, a hose, a fountain, etc.).

Figure 10B:
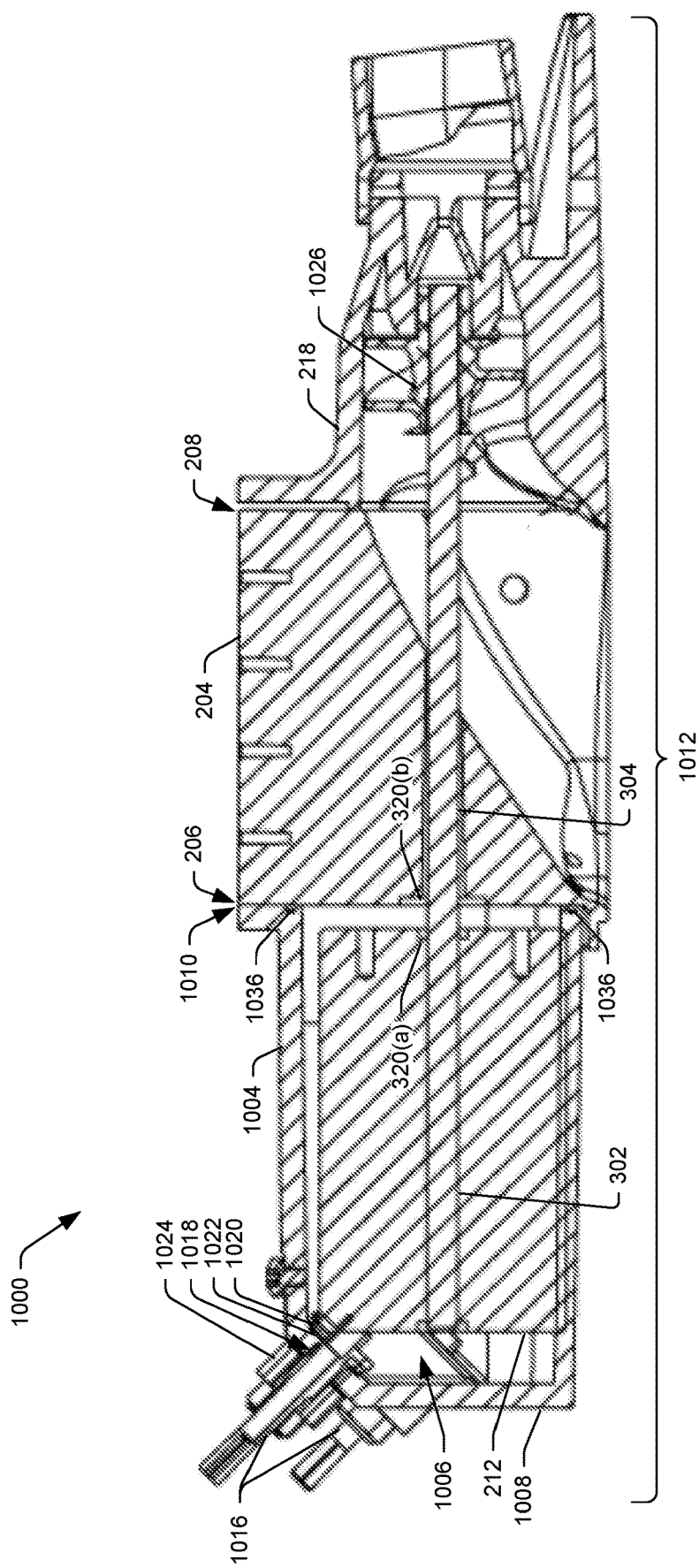
FIG. 10B illustrates a section view of the example pump assembly for creating a jet of water shown in FIG. 10A.
Figure 11B:
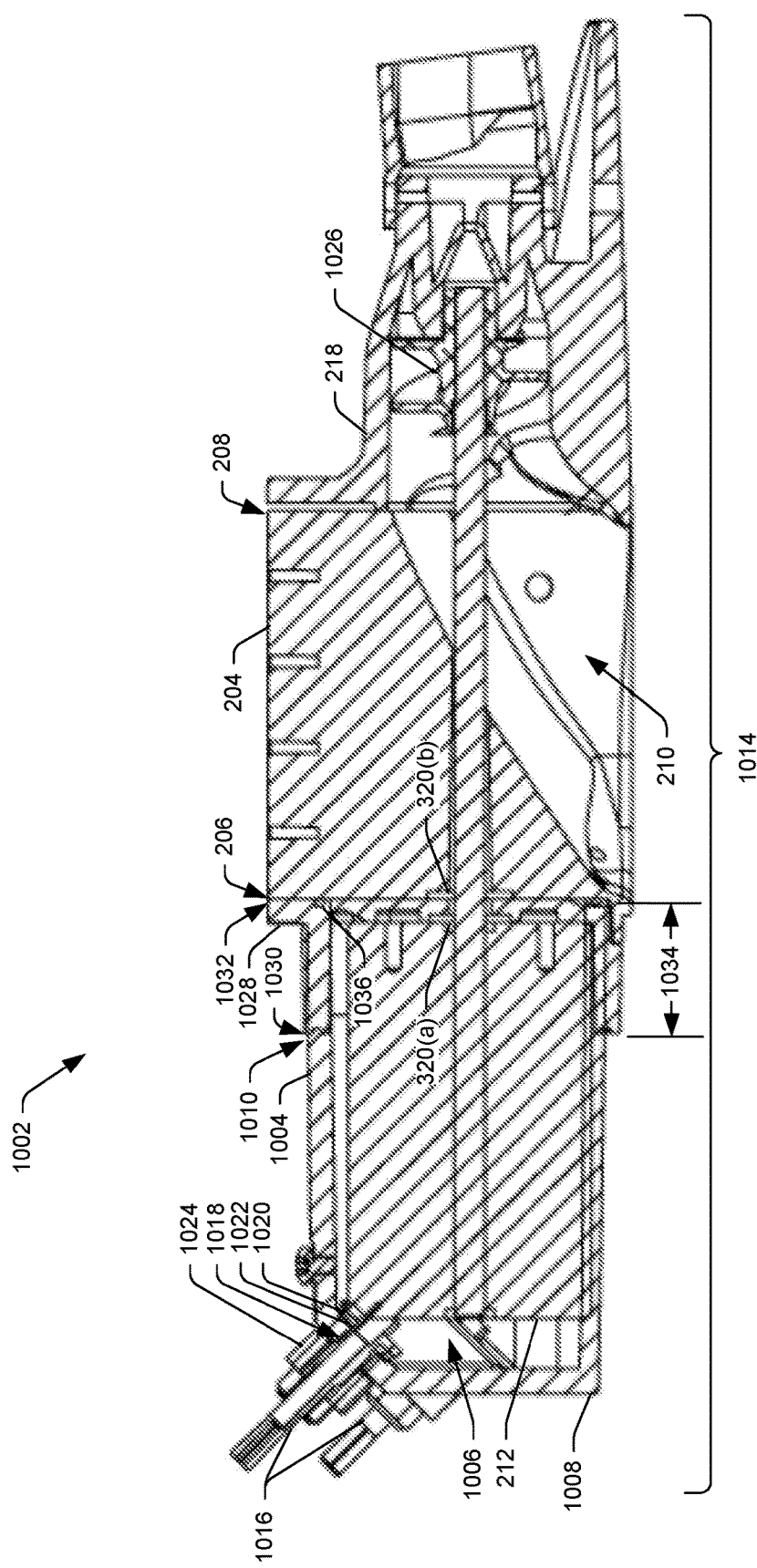
FIG. 11B illustrates a section view of the example pump assembly for creating a jet of water shown in FIG. 11A.

FIG. 10B illustrates a section view 1012 of the pump assembly 1000 taken along the section line B-B and FIG. 11B illustrates a section view 1014 of the pump assembly 1002 taken along the section line C-C. As discussed above with regard to FIG. 2, the motor 212 may be an electric motor and may receive power from one or more batteries (not shown) via one or more wires 216. One or more posts 1016 may be attached to one or more ends of the one or more wires 216 for receiving power from the one or more batteries. FIGS. 10B and 11B illustrate the enclosure 1004 may include one or more apertures 1018 for receiving at least a portion of the one or more posts 1016. One or more gaskets 1020 may be disposed with the one or more apertures 1018.

The one or more gaskets 1020 can be the same as gaskets 320(a) and 320(b). The one or more gaskets 1020 may receive at least a portion of the one or more posts 1016 arranged adjacent to a surface 1022 of the cavity 1006 of the enclosure 1004 for sealing the one or more posts 1016 to the surface 1022 of the cavity 1006. The one or more gaskets 1020 can be the same as the gaskets 320(a) and 320(b) discussed above with regard to FIG. 3. One or more insulators 1024 may be disposed with the one or more posts 1016. The one or more insulators 1024 may provide for electrically insulating the one or more posts 1016 from the enclosure 1004. While FIGS. 10B and 11B illustrate the enclosure 1004 including one or more insulators 1024, the enclosure may not include the one or more insulators 1024. For example, as discussed above, the enclosure 1004 may be formed of plastic, and in this example, the plastic forming the enclosure 1004 may provide for electrically insulating the one or more posts 1016. The one or more posts 1016 may be secured to the enclosure 1004 via one or more nuts. The one or more nuts may threadably attach to at least a portion of the one or more posts 1016 and compress the one or more gaskets 1020 and/or the one or more insulators 1024.

Section views 1012 and 1014 show the motor 212 may include the rotor 302 having the shaft 304 extending from the motor 212 and through the first body 204. The shaft 304 including a substantially single unit of material and having an end rotationally couplable to an impeller 1026 that when the shaft 304 is rotatably displaced by the motor 212, the impeller 1026 displaces the fluid behind the first body 204 to create the jet of fluid. The impeller 1026 can be the same as impellers 308 and 904 discussed above.

FIGS. 11A and 11B illustrate the pump assembly 1002 may include a plate 1028. The plate 1028 can be the same as the plate 214 discussed above. Section view 1014 illustrates the plate 1028 having a front surface 1030 opposite a back surface 1032. The front surface 206 of the first body 204 may be arranged adjacent to the back surface 1032 of the plate 1028. The motor 212 may be arranged adjacent to the front surface 1030 of the plate 1028. Section view 1014 illustrates the back surface 1010 of the enclosure 1004 may be arranged adjacent to the front surface 1030 of the plate 1028. Section view 1014 illustrates the plate 1028 may have a length 1034 extending along a longitudinal axis of the pump assembly 1002 between the front surface 1030 and the back surface 1032 of the plate 1028. The length 1034 of the plate 1028 may vary according to a size of the motor 212. For example, the length 1034 of the plate 1028 may be longer for a larger more powerful motor (e.g., 82 mm long 3500W motor) than a length of a plate for a smaller less powerful motor (e.g., 50 mm in length 1000W motor) to provide for an extension of the plate 1028 for receiving a portion of a larger more powerful motor. In another example, the plate 1028 may have a relatively smaller length 1034 to provide for an extension of the plate 1028 for receiving a smaller less powerful motor than a larger more powerful motor. In another example, the plate 1028 may have a relatively smaller length 1034 defining a thickness of the plate 1028 void of an extension for receiving a portion of a smaller less powerful motor.

In some embodiments, the plate 1028 may be formed of a metal (e.g., aluminum, brass, steel, stainless steel, etc.). The plate 1028 may be formed of any material that may be thermally conductive and/or that may provide a necessary strength. The metal forming the plate 1028 can provide for transferring heat generated by the motor 212 from the dielectric fluid contained in the cavity 1006 of the enclosure 1004 to the plate 1028. For example, at least a portion of the plate 1028 formed of the metal may be in communication with the cavity 1006 of the enclosure 1004 that when the motor 212 is operating, the motor 212 displaces the dielectric fluid across at least the portion of the plate 1028 formed of the metal to provide for transferring the heat in the dielectric fluid generated by the motor 212 to the plate formed of the metal. Moreover, when the impeller 1026 displaces the fluid into the cavity 210 of the first body 204, the displaced fluid cools the first body 204 such that the metal forming the plate 1028 transfers the heat from the plate 1028 to the first body 204. The plate 1028 may include a plurality of grooves, channels, notches, etc. arranged in a surface proximate to the interface of the motor 204 and the plate 1028. The plurality of grooves, channels, notches, etc. arranged in the surface proximate to the interface of the motor 204 and the plate 1028 can provide for directing a circulation of the dielectric fluid contained in the cavity 1006 of the enclosure 1004 for transferring heat in the dielectric fluid generated by the electric motor to the plate 1028.

Section view 1012 illustrates an O-ring 1036 may be arranged between the back surface 1010 of the enclosure 1004 and the front surface 206 of the first body 204 for sealing the back surface 1010 of the enclosure 1004 to the front surface 206 of the first body 204. The back surface 1010 of the enclosure may include a groove for holding the O-ring 1036 in the back surface 1010 of the enclosure 1004. Similar to the plate 1028 discussed above, the front surface 206 of the first body 204 may include a plurality of grooves, channels, notches, etc. arranged in the surface proximate to the interface of the motor 204 and the first body 204. The plurality of grooves, channels, notches, etc. arranged in the surface proximate to the interface of the motor 204 and the first body 204 can provide for forcing the dielectric fluid contained in the cavity 1006 of the enclosure 1004 to circulate around the motor 204 submerged in the dielectric fluid.

Section view 1014 illustrates the O-ring 1036 may be arranged between the back surface 1032 of the plate 1028 and the front surface 206 of the first body 204 for sealing the back surface 1032 of the plate 1028 to the front surface 206 of the first body 204. The back surface 1032 of the plate 1028 may include a groove for holding the O-ring 1036 in the back surface 1032 of the plate 1028. Moreover, the O-ring 1036 may be arranged between the back surface 1010 of the enclosure 1004 and the front surface 1030 of the plate 1028 for sealing the back surface 1010 of the enclosure 1004 to the front surface 1030 of the plate 1028. The back surface 1010 of the enclosure 1004 may include a groove for holding the O-ring 1036 in the back surface 1010 of the enclosure 1004. Similar to section view 300, section views 1012 and 1014 illustrate, the pump assemblies 1000 and 1002 may include gasket 320(a) and 320(b) arranged around the shaft 304 of the motor 212. While section views 1012 and 1014 illustrates an O-ring may be used for sealing surfaces other sealing techniques may be used. For example, a gasket (e.g., flat gasket), a liquid silicone, etc. may be used for sealing the surfaces.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A pump assembly for creating a jet of fluid, the pump assembly comprising:
   a plate having a front surface opposite a back surface arrangeable with a vessel capable of floating or submerging in the fluid;
   a first body having a front surface opposite a back surface and at least a portion of a cavity arrange between the front surface and the back surface, the first body arrangeable in the vessel wherein the front surface of the first body is arranged adjacent to the back surface of the plate;
   an electric motor arrangeable adjacent to the front surface of the plate, the electric motor including:
      a rotor having a shaft extending from the electric motor and having an end arrangeable adjacent to the back surface of the first body, the shaft including a substantially single unit of material and the end of the shaft rotationally couplable to an impeller that when the shaft is rotatably displaced by the electric motor, the impeller displaces the fluid into the cavity arranged between the front surface of the first body and the back surface of the first body and into a second body to create the jet of the fluid; and
   an enclosure having a front surface opposite a back surface and a cavity arranged between the front surface and the back surface, the back surface of the enclosure arrangeable adjacent to the front surface of the plate and the electric motor arrangeable in the cavity of the enclosure,
   wherein the enclosure protects the electric motor arranged in the enclosure from the fluid, and a dielectric fluid is containable in the cavity of the enclosure to immerse the electric motor in the dielectric fluid for preventing corrosion of the electric motor from the fluid; and
   wherein:
      the electric motor further includes one or more wires and one or more posts attached to one or more ends of the one or more wires for receiving power from one or more batteries,
      the enclosure includes one or more apertures for receiving at least a portion of the one or more posts, and one or more gaskets are disposed with the one or more apertures, the one or more gaskets for receiving at least a portion of the one or more posts arranged adjacent to a surface of the cavity of the enclosure for sealing the one or more posts to the surface of the cavity.

2. The pump assembly according to claim 1, further comprising an O-ring arranged between the back surface of the enclosure and the front surface of the plate for sealing the back surface of the enclosure to the front surface of the plate.

3. The pump assembly according to claim 2, wherein the back surface of the enclosure includes a groove for holding the O-ring in the back surface of the enclosure.

4. The pump assembly according to claim 1, further comprising one or more insulators disposed with the one or more posts, the one or more insulators for electrically insulating the one or more posts from the enclosure.

5. The pump assembly according to claim 1, wherein the front surface of the plate includes one or more grooves for directing a circulation of the dielectric fluid in the cavity of the enclosure for transferring heat in the dielectric fluid generated by the electric motor to the plate.

6. The pump assembly according to claim 1, wherein the plate is formed of a metal, and the metal forming the plate provides for transferring heat in the dielectric fluid generated by the electric motor to the plate.

7. The pump assembly according to claim 6, wherein when the electric motor is operating, the electric motor displaces the dielectric fluid contained in the cavity of the enclosure to circulate the dielectric fluid across at least a portion of the plate formed of the metal to provide for transferring heat in the dielectric fluid generated by the electric motor to the plate.

8. The pump assembly according to claim 1, wherein the enclosure is formed of a plastic.

9. The pump assembly according to claim 8, wherein at least a portion of the plastic forming the enclosure is transparent for providing a user with a visual of the electric motor submerged in the dielectric fluid.

10. The pump assembly according to claim 1, wherein the fluid comprises seawater or fresh water, and further comprising the vessel capable of floating or submerging in the seawater or fresh water.

11. A pump assembly for creating a jet of fluid, the pump assembly comprising:
   an electric motor arrangeable adjacent to a front surface of a body arrangeable with a vessel capable of floating or submerging in the fluid, the electric motor including:
      a rotor having a shaft extending from the electric motor, the shaft including a substantially single unit of material and having an end rotationally couplable to an impeller that when the shaft is rotatably displaced by the electric motor, the impeller displaces the fluid behind the body to create the jet of fluid; and
   an enclosure having a front surface opposite a back surface and a cavity arranged between the front surface and the back surface, the back surface of the enclosure arrangeable adjacent to the front surface of the body and the electric motor arrangeable in the cavity of the enclosure, wherein the enclosure protects the electric motor arranged in the enclosure from the fluid, and a dielectric fluid is containable in the cavity of the enclosure to immerse the electric motor in the dielectric fluid for preventing corrosion of the electric motor from the fluid; and
   wherein:
      the electric motor further includes one or more wires and one or more posts attached to one or more ends of the one or more wires for receiving power from one or more batteries,
      the enclosure includes one or more apertures for receiving at least a portion of the one or more posts, and one or more gaskets are disposed with the one or more apertures, the one or more gaskets for receiving at least a portion of the one or more posts arranged adjacent to a surface of the cavity of the enclosure for sealing the one or more posts to the surface of the cavity.

12. The pump assembly according to claim 11, further comprising one or more insulators disposed with the one or more posts, the one or more insulators for electrically insulating the one or more posts from the enclosure.

13. A pump assembly for creating a jet of fluid, the pump assembly comprising:
   an electric motor arrangeable adjacent to a front surface of a body, the electric motor including:
      a rotor having a shaft extending from the electric motor, the shaft including a substantially single unit of material and having an end rotationally couplable to an impeller that when the shaft is rotatably displaced by the electric motor, the impeller displaces the fluid behind the body to create the jet of fluid; and an enclosure having a front surface opposite a back surface and a cavity arranged between the front surface and the back surface, the back surface of the enclosure arrangeable adjacent to the front surface of the body and the electric motor arrangeable in the cavity of the enclosure, wherein the enclosure protects the electric motor arranged in the enclosure from the fluid, and a dielectric fluid is containable in the cavity of the enclosure to immerse the electric motor in the dielectric fluid for preventing corrosion of the electric motor from the fluid; and wherein:

the electric motor further includes one or more wires and one or more posts attached to one or more ends of the one or more wires for receiving power from one or more batteries, the enclosure includes one or more apertures for receiving at least a portion of the one or more posts, and one or more gaskets are disposed with the one or more apertures, the one or more gaskets for receiving at least a portion of the one or more posts arranged adjacent to a surface of the cavity of the enclosure for sealing the one or more posts to the surface of the cavity.

14. The pump assembly according to claim 13, further comprising one or more insulators disposed with the one or more posts, the one or more insulators for electrically insulating the one or more posts from the enclosure.

* * * * *